United States Patent [19]
Eijkelenkamp et al.

[11] Patent Number: 4,574,329
[45] Date of Patent: Mar. 4, 1986

[54] MULTILAYER CERAMIC CAPACITOR

[75] Inventors: Antonius J. H. Eijkelenkamp; Gijsbertus de With; Willem R. de Wild, all of Eindhoven, Netherlands

[73] Assignee: U.S. Philips Corporation, New York, N.Y.

[21] Appl. No.: 656,220

[22] Filed: Oct. 1, 1984

[30] Foreign Application Priority Data

Oct. 7, 1983 [NL] Netherlands ............ 8303448
Jun. 13, 1984 [NL] Netherlands ............ 8401865

[51] Int. Cl.$^4$ ............................................. H01G 1/01
[52] U.S. Cl. .................................................. 361/321
[58] Field of Search .............................. 361/320–322

[56] References Cited
U.S. PATENT DOCUMENTS

| | | | |
|---|---|---|---|
| 3,237,066 | 2/1966 | Martin et al. ............... | 361/321 X |
| 3,679,950 | 7/1972 | Rutt .............................. | 361/321 |
| 3,720,862 | 3/1973 | Mason ........................... | 361/320 |
| 3,879,645 | 4/1975 | Rutt et al. .................... | 361/321 |
| 3,902,102 | 8/1975 | Burn ............................. | 361/321 |
| 4,447,853 | 5/1984 | Tomuro et al. ............... | 361/321 |

Primary Examiner—Donald Griffin
Attorney, Agent, or Firm—Norman N. Spain

[57] ABSTRACT

A multilayer ceramic capacitor characterized by a stack of alternate layers of dielectric oxidic ceramic material and of electrode layers consisting of a mixture of a metal having a high electric conductivity and ceramic particles of a material having a sintering temperature which is above the sintering temperature of the oxidic ceramic material of the dielectric layers. As a result of this electrode layer composition, the capacitor can be manufactured by means of a uniaxial pressure sintering process in which the stack is sintered while simultaneously applying pressure in the direction transverse to the plane of the layers. This leads to dielectric layers which are substantially free from pores and have a thickness of at most 20 μm.

20 Claims, 3 Drawing Figures

MULTILAYER CERAMIC CAPACITOR

BACKGROUND OF THE INVENTION

The invention relates to a multilayer capacitor composed of alternate layers of a dielectric oxidic ceramic material and of an electrode material, formed into a compact unit by the application of heat and pressure.

Multilayer capacitors of the above-described type (so-called monolithic ceramic capacitors) have so far generally been manufactured on an industrial scale as follows.

A slurry of finely ground ceramic dielectric powder mixed with a binder is deposited in thin layers which are dried to form foils and the foils are then provided with electrodes by means of silk-screening a metal paste on them. The electroded foils are stacked and compressed and severed into separate capacitor bodies. Said capacitor bodies are sintered at temperatures between 1200° and 1400° C., depending on the composition of the ceramic, dielectric material. During sintering the ceramic, dielectric foils shrink and assume a dense polycrystalline structure, the density of the sintered material being larger than that of the original foils. Simultaneously the powder particles of the metal paste sinter to form electrode layers of metal which form a coherent assembly with the dielectric layers.

In practice, however, it is difficult to make a stack of perfect thin layers. Short-circuits at low voltages may occur, these are ascribed to too high a porosity and to the occurrence of cracks and delaminations, i.e. the non-adherence of layers in the final product, respectively.

The porosity could be restricted by causing the sintering to take place while simultaneously applying pressure, so-called pressure-sintering. In a commonly-owned copending patent application Ser. No. 656,219, filed Oct. 1, 1984 it is disclosed that if said pressure is not applied on all sides (isostatically) but in a direction transverse to the plane of the layer (uniaxially), the occurrence of delaminations could also be prevented. This teaching is herein incorporated by reference. Experiments which have led to the present invention, however, have demonstrated than when a uniaxial pressure-sintering process is used to manufacture multilayer capacitors, a new problem may occur: the final products sometimes do not satisfy the requirements imposed because the metal of the electrode layers tends to mix to a greater or lesser extent with the oxidic ceramic material of the dielectric layers. This is ascribed to the condition that as a result of the high pressures which are exerted during the uniaxial pressure-sintering process, the flow limit of the metal of the electrode layers is surpassed. The metal which in these conditions is comparatively soft is then easily pressed into the ceramic material which at the beginning of the sintering has not yet reached its maximum density. This pressure problem becomes more serious as the thickness of the ceramic layers decreases.

BRIEF SUMMARY OF THE INVENTION

The invention solves this problem in that it provides a multilayer capacitor of the type described in the opening paragraph which is characterized by layers of electrode material which consist of a mixture of 7 to 60% by volume of metal having a high electric conductivity and of 40 to 93% by volume of ceramic particles of a material having a sintering temperature which is higher than the sintering temperature of the oxidic ceramic material of the dielectric layers. More in particular the electrode material consists of a mixture of an inert oxide and a noble metal. The addition of a given quantity of ceramic particles, which do not take part in the sintering process, to the metal of the electrode layers causes a separation to remain between adjacent dielectric ceramic layers during the uniaxial pressure-sintering process. The ceramic particles which remain in the electrode layers in an unaltered condition serve, as it were, as pillars which ensure that the metal cannot be pressed into the ceramic layers. The "pillars" have a relieving effect as a result of which the pressure is not exerted directly on the metal. In order that said function should be carried out effectively, the ceramic particles content of the electrode layer should preferably be not less than 40% by volume. With a share of more than 90% by volume of ceramic particles, the conductivity of the electrode layers may become too small for certain applications. Dependent inter alia on the size of the particles, a reasonable conductivity is still realized with 7% by volume of metal in the electrode layer.

Representative materials for the metal of the electrode layers are, for example, Pd (melting point 1552° C.), Pt (melting point 1774° C.), Ni (melting point 1445° C.), Ag (melting point 961° C.), Cu (melting point 1083°) and alloys thereof.

Suitable materials for the ceramic particles in the electrode layers are, for example, $ZrO_2$ and $Al_2O_3$. Barium titanate may also be used if it has a sintering reactivity which differs from the sintering reactivity of the barium titanate of the dielectric such that it sinters badly with it.

Suitable oxidic ceramic dielectric materials are representatives from the titanates, the zirconates, the titanate-zirconates, and the of tungstates. Most of these materials are ferro-electric at room temperature. An exception is strontium titanate which is not ferro-electric at room temperature. This titanate and other non-ferro-electric materials may also be used as a dielectric in capacitors according to the invention.

In order to make multilayer capacitors which satisfy certain high quality requirements, however, barium titanate is preferably used as a material for the dielectric layers. For various purposes, small but specific quantities of Co, Ni, Mn, Mg, Ta, Bi and/or Nb may be added hereto. In order that the barium titanate obtains the desired dielectric properties, it should be fired in an oxidizing atmosphere (high partial oxygen pressure). In manufacturing multilayer capacitors by means of a conventional sintering process, hitherto Pd has usually been used as an electrode material in connection with said oxidizing atmosphere.

The invention enables the use of a uniaxial pressure-sintering process as a result of which the peak temperature may be approximately 200 Celsius degrees lower than in the conventional sintering process. This means that the electrode metal may consist of an Ag-Pd alloy (which has a lower melting-point than Pd), instead of pure Pd. The lower the pressure-sintering temperature, the higher may be the Ag content (and the lower the price) of the Ag-Pd alloy. Experiments have demonstrated that, if the Ag content increases, in particular above 30 at.%, without the negative addition of particles of ceramic material not taking part in the sintering process, the phenomenon of the electrode layers being pressed into the ceramic material becomes more and more serious. According to a particular embodiment of the invention, the electrode metal may even consist entirely of Ag without this problem presenting itself.

Within the scope of the conventional sintering process of multilayer capacitors, it has already been suggested to add ceramic particles to the material of the electrode layers. However, this served quite a different purpose from that to which the present invention is directed, namely the compensation of the difference in coefficients of expansion between the electrode material and the ceramic or the better sintering together of electrode material and ceramic. In both cases the ceramic material to be added to the electrode metal essentially had the same composition as the ceramic material of the dielectric layers. Since in the conventional sintering process no presssure is exerted on the multilayer structures, the problem for which the invention provides a solution does not occur there.

DETAILED DESCRIPTION OF THE INVENTION

Figure 1:
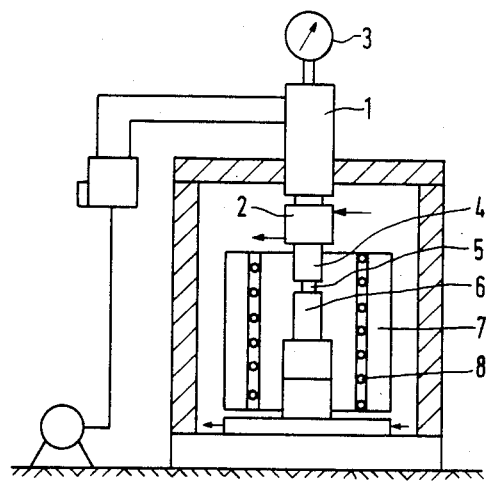
FIG. 1 is a diagrammatic view of a pressure sintering system for use in the method of the invention.
Figure 2:
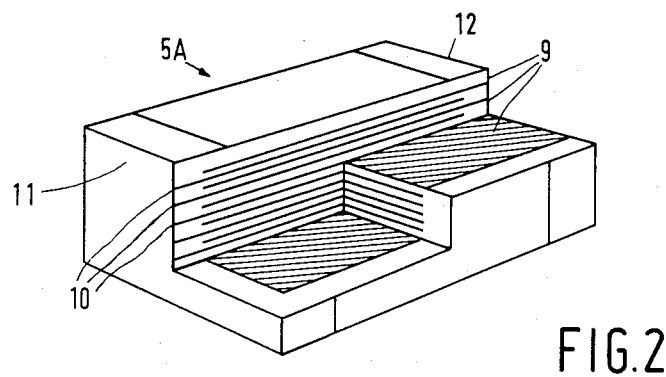
FIG. 2 is an elevation partly in cross-section of a multilayer ceramic capacitor.
Figure 3:
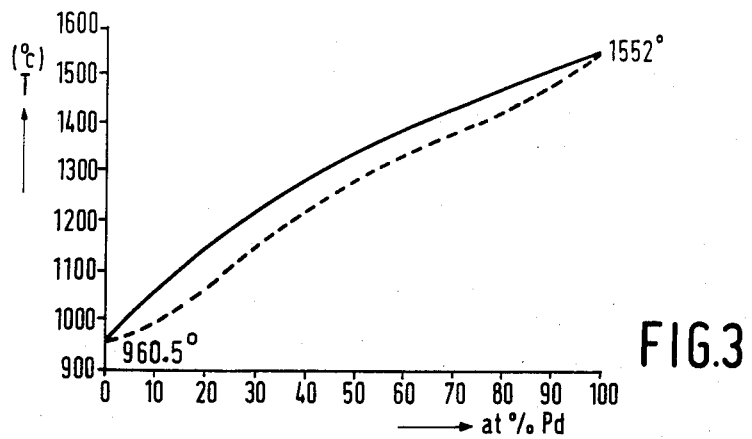
FIG. 3 is a graph of the phase diagram of Ag-Pd.

The invention will be described in greater detail with reference to an embodiment and to the drawing in which:

FIG. 1 shows a pressure-sintering system;

FIG. 2 is an elevation partly in cross-section of a multilayer ceramic capacitor; and FIG. 3 shows the phase diagram of Ag-Pd.

For the manufacture of multilayer ceramic capacitors according to the invention, a pressure-sintering system may be used such as is shown in FIG. 1. In principle this is a pressure system consisting of a hydraulic press 1 having a cylinder 2 with a water-cooled head. The pressures which are exerted depend upon the peak temperature which is applied during the pressure-sintering process. The interesting pressure range is between 200 bar and 5 kbar. The pressure can be read on a manometer 3. The pressure is transferred via a top die 4 of a refractory material capable of withstanding high temperatures, for example $Al_2O_3$ or $SiO$.

A packet 5 to be compressed is placed on a lower die 6 also of refractory material, it being ensured that the die surfaces which put the pressure on the packet are as parallel as possible. The dies 4, 6 are accommodated in a tube furnace 7 having a heating coil 8. The hydraulic system 1, 2 provides the possibility of controlling the pressure build-up, while the closed envelope provides the possibility of operating under different gas conditions.

For making the dielectric ceramic foils, for example, a low-doped barium titanate is used, preferably having such a particle size that after hot-pressing the grain size is smaller than 1 μm.

By means of barium titanate powder which comprises 1.2% by weight of $Nb_2O_5$ and 0.3% by weight of $Co_3O_4$, a dielectric constant $\epsilon_r$ of 3,000 can be realized and a capacitor can be obtained having a temperature coefficient of the capacitance $$TC = \frac{C_T - C_{25}}{C_{25}} \times 100\%$$

which is smaller than 15% in the temperature range from $-55°$ C. to $125°$ C. Herewith it satisfies the so-called X7R specification. (For comparison, in order to satisfy the Z5U specification, the temperature coefficient of the capacitance must be between $+22\%$ and $-56\%$ in the temperature range from $+10°$ C. to $85°$ C.). The powder is mixed with an organic binder (for example polyvinyl alcohol). Of the moulding mass thus obtained, sheets are drawn in a thickness of a few tens of microns, in particular 20–50 microns. After drying, foils are cut herefrom to the correct size. Patterns of electrode material consisting of a mixture of oxidic ceramic powder and metallic powder in a binder, are provided on the foils by means of silk-screening. The respective sheets are stacked so that a packet 5 is formed in which in each ultimate capacitor body the electrode patterns 9, 10 alternately extend to one side 11 and to the opposite side 12 so that every two successive electrode patterns overlap each other partly (FIG. 2). In order to obtain a good mutual bonding of the layers, the packet 5 is first laminated by subjecting it to a pressure of approximately 3 kbar at a temperature of approximately 75° C. The binder is then fired from the foils. This may be done in a separate furnace. When a uniaxial pressure-sintering process is used, however, firing may be carried out very practically by performing it in the pressure-sintering apparatus during the heating of the complete packets to the peak temperature.

The packet 5 to be subjected to a pressure-sintering process is placed between the dies 4 and 6 of the pressure system 1 with an anti-adhesion layer which may comprise, for example, $ZrO_2$ between the disc and the lower and upper sides, respectively, of the packet.

Heating the furnace 7 with the packet 5 placed therein to the pressure-sintering temperature takes place in approximately 90 minutes. Depending on the composition of the oxidic ceramic dielectric material, the pressure-sintering temperature may be between approximately 900° and 1200° C. The pressure-sintering temperatures are approximately 200 Celsius degrees lower than the sintering temperatures in the conventional sintering process. When the pressure-sintering temperature is reached, the pressure is applied. Depending on the pressure-sintering temperature it is between 200 bar and 5 kbar. In the present experiments the pressure-sintering temperature was approximately 1080° C. and the pressure was approximately 500 bar. Dependent on the adjusted temperature and pressure, a sintering time of up to approximately 120 minutes may be necessary. The pressure is then released and the assembly is cooled to room temperature.

The integral assembly obtained after hot pressing and cooling to room temperature is sawn into pieces so as to obtain separate monolithic ceramic capacitor chips. On each chip 5A (see FIG. 2) the sides 11, 12 at which the respective electrodes 10, 9 terminate are metallized so as to form head contacts (FIG. 2). The resulting capacitors had the following properties.

| Dimension | N | n | d (um) | C (nF) | tan ($17^{-4}$) | $R_{iso}$ ($10^4$M) | $V_o$ (V) |
|---|---|---|---|---|---|---|---|
| 1210 | 34 | 50 | 17 | 230 | 157 | 2 | 630 |

-continued

| Dimension | N | n | d (um) | C (nF) | tan ($17^{-4}$) | $R_{iso}$ (104M) | $V_o$ (V) |
| --- | --- | --- | --- | --- | --- | --- | --- |
| 1812 | 70 | 50 | 17 | 900 | 160 | 1 | 580 | wherein:
N: number of dielectric layers
d: thickness dielectric layers
n: number of samples
C: capacitance
tan: loss factor (tangent of the loss angle)
$R_{iso}$: insulation resistance
$V_o$: breakdown voltage.

It appears from these results that a very high capacitance per unit volume can be realized. When dielectric layers are realized which are thinner than 17 μm even the μF region is achieved.

FIG. 3 shows the phase diagram of the Ag-Pd system.

Depending on the Ag content, the melting point of Ag-Pd is between 961° C. and 1552° C. The invention enables the use of Ag-Pd with a considerable Ag content as an electrode metal. It has been found that the electrode metal may even consist entirely of Ag, and hence be Pd-free. In a successful multilayer ceramic capacitor of the above-mentioned type, the electrode material contained 50% by weight of Ag and 50% by weight of $ZrO_2$. The pressure-sintering temperature was 1115° C., the pressure was approximately 500 bar and the pressure-sintering time was 5 minutes. It is surprising that in this method the pressure-sintering temperature used (1115° C.) is considerably above the melting-point of the Ag used as an electrode metal (961° C.). It might be expected that in these circumstances the electrode material is pressed into the ceramic material of the dielectric layers, but this proves not to be the case. It would be more obvious to apply pressure-sintering temperatures which remain below the melting-point of the electrode metal, hence in the case of Ag below 961° C. However, at the pressures applied in the present method, the ceramic material does not become sufficiently dense.

Summarizing it may be said that the invention makes it possible to manufacture multilayer ceramic capacitors having dielectric layers with a thickness of at most 20 μm and which are substantially free from pores (density >99% of the material) of the theoretical density.

What is claimed is:

1. A multilayer capacitor composed of alternate dielectric layers of dielectric oxidic ceramic material and of an electrode material, and formed into a compact unit by the application of heat and pressure, characterized in that the capacitor is formed of a compact unit through a thermal treatment by simultaneously applying pressure in a direction transverse to the planes of said layers, and has layers of electrode material consisting of a mixture of 7 to 60% by volume of metal having a high conductivity and of 40 to 93% by volume of particles of a ceramic material having a sintering temperature which is higher than the sintering temperature of the oxidic ceramic material of the dielectric layers.

2. A multilayer capacitor as claimed in claim 1, characterized in that the electrode material comprises an inert oxide as the ceramic material.

3. A multilayer capacitor as claimed in claim 2, characterized in that the ceramic material of the electrode layers is $ZrO_2$.

4. A multilayer capacitor as claimed in claim 3, characterized in that the oxidic ceramic material of the dielectric layers is barium titanate.

5. A multilayer capacitor as claimed in claim 3, characterized in that the layers of dielectric oxidic ceramic material have a thickness of at most 20 μm and a density of at least 99%.

6. A multilayer capacitor as claimed in claim 2, characterized in that the oxidic ceramic material of the dielectric layers is barium titanate.

7. A multilayer capacitor as claimed in claim 2, characterized in that the layers of dielectric oxidic ceramic material have a thickness of at most 20 μm and a density of at least 99%.

8. A multilayer capacitor as claimed in claim 1, characterized in that the electrode material comprises a noble metal as the metal.

9. A multilayer capacitor as claimed in claim 8 characterized in that the noble metal is an Ag-Pd alloy.

10. A multilayer capacitor as claimed in claim 9 characterized in that the Ag-Pd alloy comprises at least 30 at.% of Ag.

11. A multilayer capacitor as claimed in claim 10 characterized in that the oxidic ceramic material of the dielectric layers is barium titanate.

12. A multilayer capacitor as claimed in claim 10, characterized in that the layers of dielectric oxidic ceramic material have a thickness of at most 20 μm and a density of at least 99%.

13. A multilayer capacitor as claimed in claim 9, characterized in that the oxidic ceramic material of the dielectric layers is barium titanate.

14. A multilayer capacitor as claimed in claim 9, characterized in that the layers of dielectric oxidic ceramic material have a thickness of at most 20 μm and a density of at least 99%.

15. A multilayer capacitor as claimed in claim 8, characterized in that the noble metal is Ag.

16. A multilayer capacitor as claimed in claim 15, characterized in that the oxidic ceramic material of the dielectric layers is barium titanate.

17. A multilayer capacitor as claimed in claim 8 characterized in that the oxidic ceramic material of the dielectric layers is barium titanate.

18. A multilayer capacitor as claimed in claim 8 characterized in that the layers of dielectric oxidic ceramic material have a thickness of at most 20 μm and a density of at least 99%.

19. A multilayer capacitor as claimed in claim 1, characterized in that the oxidic ceramic material of the dielectric layers is barium titanate.

20. A multilayer capacitor as claimed in claim 1, characterized in that the layers of dielectric oxidic ceramic material have a thickness of at most 20 μm and a density of at least 99%.

* * * * *